(12) United States Patent
Li (10) Patent No.: US 9,235,893 B2
(45) Date of Patent: Jan. 12, 2016

(54) METHOD AND DEVICE FOR DETERMINING IMAGE OFFSET AND STORAGE MEDIUM

(71) Applicants: HISENSE MOBILE COMMUNICATIONS TECHNOLOGY CO., LTD., Qingdao (CN); HISENSE USA CORP., Suwanee, GA (US)

(72) Inventor: Bing Li, Qingdao (CN)

(73) Assignee: HISENSE MOBILE COMMUNICATIONS TECHNOLOGY CO., LTD., Qindao (CN)

(*) Notice: Subject to any disclaimer, the term of this patent is extended or adjusted under 35 U.S.C. 154(b) by 0 days.

(21) Appl. No.: 14/292,556

(22) Filed: May 30, 2014

(65) Prior Publication Data

US 2015/0213603 A1 Jul. 30, 2015

(30) Foreign Application Priority Data

Jan. 24, 2014 (CN) .......................... 2014 1 0036125

(51) Int. Cl.
*G06K 9/46* (2006.01)
*G06T 7/00* (2006.01)
*G06T 5/50* (2006.01)

(52) U.S. Cl.
CPC ................ *G06T 7/0038* (2013.01); *G06T 5/50* (2013.01); *G06T 7/003* (2013.01); *G06T 7/0026* (2013.01); *G06T 2200/32* (2013.01); *G06T 2207/10004* (2013.01); *G06T 2207/20021* (2013.01); *G06T 2207/20221* (2013.01)

(58) Field of Classification Search
None
See application file for complete search history.

(56) References Cited

U.S. PATENT DOCUMENTS 5,822,454 A * 10/1998 Rangarajan .................... 382/180
7,333,677 B2 * 2/2008 Sakai et al. .................... 382/294
8,581,995 B2 * 11/2013 Lin et al. .................... 348/218.1

* cited by examiner

*Primary Examiner* — Chan Park
*Assistant Examiner* — Eung-Nan Yeh
(74) *Attorney, Agent, or Firm* — Knobbe Martens Olson & Bear LLP (57) ABSTRACT

The disclosure relates to the field of image processing technologies and particularly to a method and device for determining an image offset and a storage medium. A method according to an embodiment of the disclosure includes: dividing equally an acquired target image into a number M*N of first sub-areas and dividing equally an acquired image to be aligned into a number M*N of second sub-areas; determining an area offset between each first sub-area and a corresponding second sub-area; and determining an image offset between the target image and the image to be aligned according to the determined multiple area offsets.

20 Claims, 6 Drawing Sheets

METHOD AND DEVICE FOR DETERMINING IMAGE OFFSET AND STORAGE MEDIUM

CROSS-REFERENCES TO RELATED APPLICATIONS

The present application claims priority to Chinese Patent Application No. 201410036125.X, filed with the State Intellectual Property Office of People's Republic of China on Jan. 24, 2014 and entitled "Method and device for determining image offset", which is incorporated herein by reference in its entirety for all purposes.

FIELD

The present disclosure relates to the field of image processing technologies and to a method and device for determining an image offset and a storage medium.

BACKGROUND

A camera device includes a photo camera, a video camera, etc., and can further include a handset, a tablet computer, a notebook computer and other mobile terminals with a front-camera and/or a back-camera, and a television set, a desktop computer and other terminal devices with an external camera.

The camera device is typically configured to acquire an image and can be further configured to present the acquired image to a user. Acquisition of an image can involve the following at least two aspects: one of the aspects relates to previewing of the image, that is, a preview image is generated before an image is taken so that the user can conveniently select an appropriate angle at which the image is taken, and the other aspect relates to taking of the image, that is, the image is taken by pressing a predetermined switch on the camera device, clicking on a predetermined area on the camera device or performing another predetermined operation. In the process above of acquiring the image, it is typically necessary to extract image details respectively from multiple acquired images to thereby compose a single image, and this may necessitate alignment of two or more images acquired at different instances of time and under different conditions (e.g., weather, illumination, and locations and angles at which the images are taken, etc.), which is referred to as image registration.

SUMMARY

Embodiments of the disclosure provide a method and device for determining an image offset and a storage medium.

According to an embodiment of the disclosure, there is a method of determining an image offset, the method including:

dividing equally an acquired target image into a number M*N of first sub-areas and dividing equally an acquired image to be aligned into a number M*N of second sub-areas, wherein the number of images acquired between the acquired target image and the acquired image to be aligned is below a preset threshold, and the aspect ratio of the target image is the same as the aspect ratio of the image to be aligned, and both M and N are positive integers, and the ratio of M to N is equal to the aspect ratios;

for each first sub-area in the target image, determining an area offset between the first sub-area and the corresponding second sub-area, wherein the location of the first sub-area in the target image is the same as the location of the corresponding second sub-area in the image to be aligned; and determining an image offset between the target image and the image to be aligned according to the area offsets between the respective first sub-area and the corresponding second sub-areas.

According to an embodiment of the disclosure, there is an device for determining an image offset, the device including one or more processors and a storage medium in which computer readable program codes are stored, wherein the computer readable program codes stored in the storage medium are executed by the one or more processors to perform a method of determining an image offset, the method including:

dividing equally an acquired target image into a number M*N of first sub-areas and dividing equally an acquired image to be aligned into a number M*N of second sub-areas, wherein the number of images acquired between the acquired target image and the acquired image to be aligned is below a preset threshold, and the aspect ratio of the target image is the same as the aspect ratio of the image to be aligned, and both M and N are positive integers, and the ratio of M to N is equal to the aspect ratios;

for each first sub-area in the target image, determining an area offset between the first sub-area and the corresponding second sub-area, wherein the location of the first sub-area in the target image is the same as the location of the corresponding second sub-area in the image to be aligned; and determining an image offset between the target image and the image to be aligned according to the area offsets between the respective first sub-area and the corresponding second sub-areas.

According to an embodiment of the disclosure, there is a non-transitory computer-readable storage medium in which computer readable program codes are stored, the computer readable program codes being executable by one or more processors to perform a method of determining an image offset, the method including:

dividing equally an acquired target image into a number M*N of first sub-areas and dividing equally an acquired image to be aligned into a number M*N of second sub-areas, wherein the number of images acquired between the acquired target image and the acquired image to be aligned is below a preset threshold, and the aspect ratio of the target image is the same as the aspect ratio of the image to be aligned, and both M and N are positive integers, and the ratio of M to N is equal to the aspect ratios;

for each first sub-area in the target image, determining an area offset between the first sub-area and the corresponding second sub-area, wherein the location of the first sub-area in the target image is the same as the location of the corresponding second sub-area in the image to be aligned; and determining an image offset between the target image and the image to be aligned according to the area offsets between the respective first sub-area and the corresponding second sub-areas.

DETAILED DESCRIPTION OF THE PREFERRED EMBODIMENT

In the solutions according to the embodiments of the disclosure, an acquired target image is divided equally into a number M*N of first sub-areas, and an acquired image to be aligned is divided equally into a number M*N of second sub-areas; and area offsets between the respective first sub-area and the corresponding second sub-areas are determined respectively, and an image offset between the target image and the image to be aligned is determined according to the determined multiple area offsets.

Embodiments of the disclosure will be described below with reference to the drawings, but the disclosure will not be limited to the following embodiments.

Figure 1:
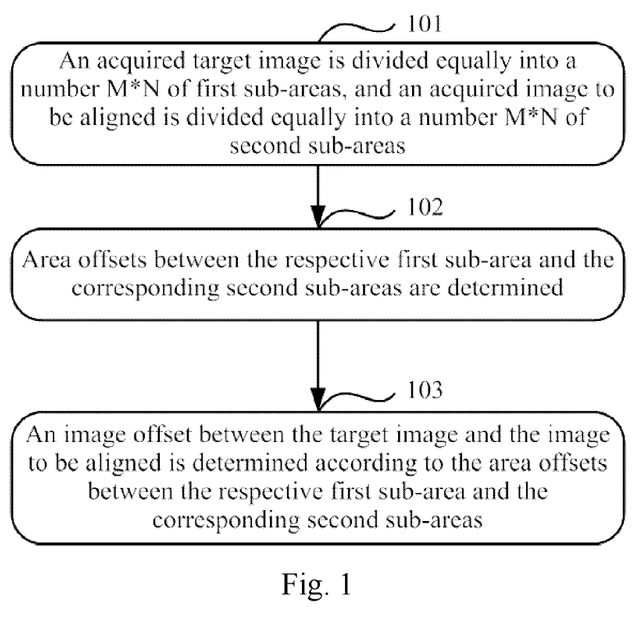
FIG. 1 is a schematic diagram of a method of determining an image offset according to an embodiment of the disclosure.

As illustrated in FIG. 1, a method of determining an image offset according to an embodiment of the disclosure includes the following steps 101 to 103

Step 101, an acquired target image is divided equally into a number M*N of first sub-areas, and an acquired image to be aligned is divided equally into a number M*N of second sub-areas;

Step 102, area offsets between the respective first sub-area and the corresponding second sub-areas are determined; and Step 103, an image offset between the target image and the image to be aligned is determined according to the area offsets between the respective first sub-area and the corresponding second sub-areas.

Although FIG. 1 illustrates a particular order in which the respective steps are performed, it shall be appreciated that the method of determining an image offset illustrated in FIG. 1 can further include other steps, and these steps and the steps illustrated in FIG. 1 can be performed in an order or can be performed concurrently (e.g., by concurrent processors or multi-threading).

Before the step 101, a number D of images can be acquired consecutively by an optical sensor, and one image is selected from the D images as a target image while the remaining images are images to be aligned. D is a positive integer above 1. For any one of the images to be aligned, an image offset between the image to be aligned and the target image can be determined in the solution according to an embodiment of the disclosure, and the image to be aligned can be aligned according to the determined image offset.

It shall be noted that the target image can be any one of the consecutively acquired D images, and an embodiment of the disclosure will be described by way of an example in which the target image is the lastly acquired image (i.e., the latest image) among the acquired D images, so the number of images acquired between the acquired target image and the acquired image to be aligned is below D−1.

In the step 101, the number of images acquired between the acquired target image and the acquired image to be aligned is below a preset threshold (e.g., D−1), and the aspect ratio of the target image is the same as the aspect ratio of the image to be aligned. Both M and N are positive integers, and the ratio of M to N is equal to the aspect ratio of the target image and the aspect ratio of the image to be aligned. For example, if both the aspect ratio of the target image and the aspect ratio of the image to be aligned are 4:3, then M:N=4:3, and the solution according to an embodiment of the disclosure will be described by way of an example in which M is 4 and N is 3.

For the sake of a convenient description, a sub-area in the target image will be referred to as a first sub-area, and a sub-area in the image to be aligned will be referred to as a second sub-area.

In the step 102, for each first sub-area in the target image, an area offset between the first sub-area and the corresponding second sub-area can be determined. The location of the first sub-area in the target image is the same as the location of the corresponding second sub-area in the image to be aligned.

Figure 2A:
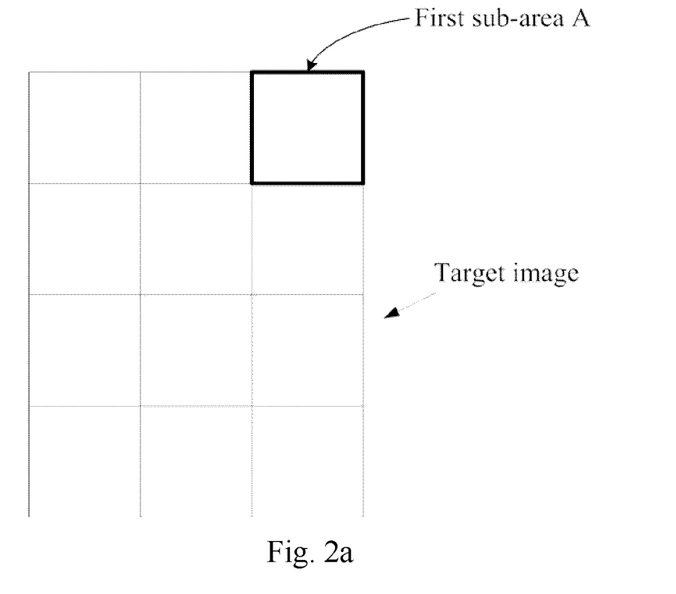
FIG. 2a is a schematic diagram of 12 first sub-areas in a target image according to an embodiment of the disclosure.
Figure 2B:
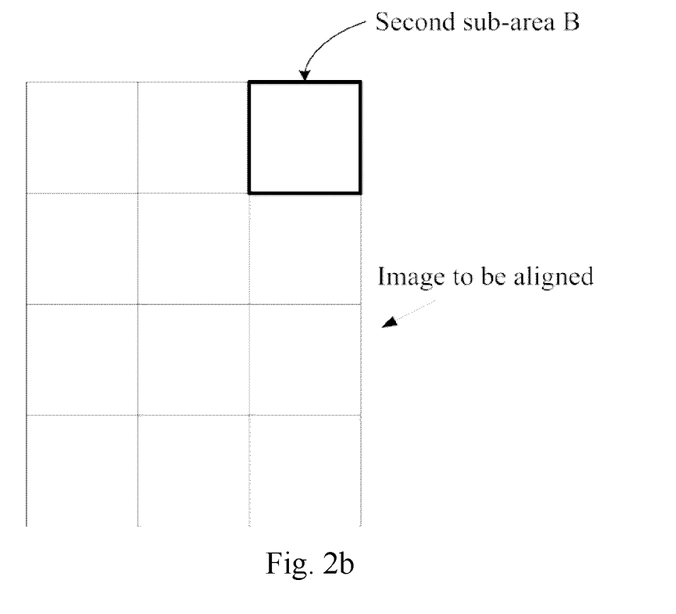
FIG. 2b is a schematic diagram of 12 second sub-areas in an image to be aligned according to an embodiment of the disclosure.

As illustrated in FIG. 2a, there is a schematic diagram of 12 first sub-areas in a target image; and as illustrated in FIG. 2b, there is a schematic diagram of 12 second sub-areas in an image to be aligned. For each first sub-area, there is a second sub-area corresponding to the first sub-area, and the location of the first sub-area in the target image is the same as the location of the corresponding second sub-area in the image to be aligned. For example, a second sub-area B in FIG. 2b is a second sub-area corresponding to a first sub-area A in FIG. 2a.

In some embodiments, for a first sub-area, an area offset between the first sub-area and the corresponding second sub-area can be determined as follows.

A fixed sample zone in the second sub-area is determined.

A set area in the first sub-area is determined, and the location of the center of the set area in the first sub-area is the same as the location of the center of the fixed sample zone in the second sub-area, and the aspect ratio of the set area is the same as the aspect ratio of the fixed sample zone, and the set area is no smaller than the fixed sample zone.

At least one floating sample zone in the set area is determined, and the size of the floating sample zone is the same as the size of the fixed sample zone.

For each floating sample zone in the set area, the feature difference between the floating sample zone and the fixed sample zone and a sample zone offset of the floating sample zone are determined. The sample zone offset of the floating sample zone is coordinate values of the center of the floating sample zone in a coordinate system created with its origin being the center of the set area.

The floating sample zone, among all the floating sample zones in the set area, with the lowest feature difference from the fixed sample zone is determined.

The sample zone offset of the determined floating sample zone is determined as the area offset between the first sub-area and the corresponding second sub-area.

Figure 3:
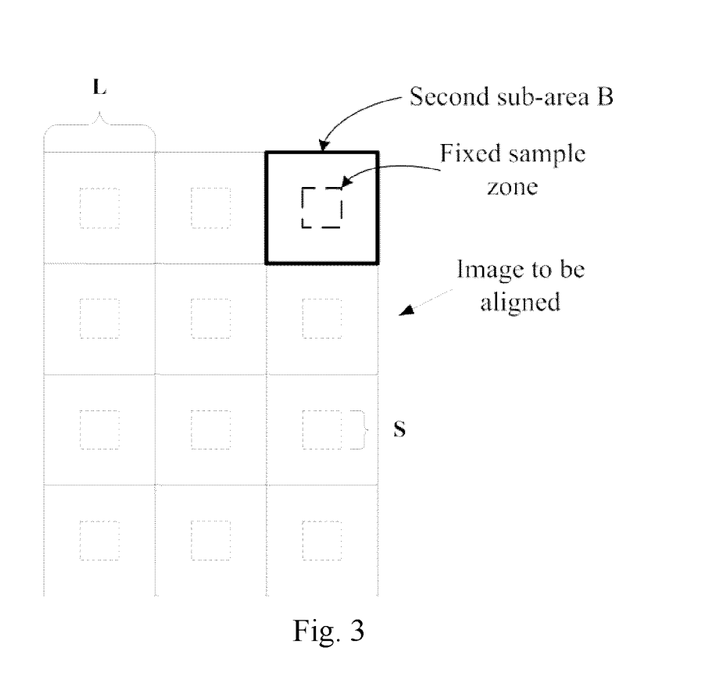
FIG. 3 is a schematic diagram of fixed sample zones centered in respective second sub-areas according to an embodiment of the disclosure.

In some embodiments of the disclosure, a fixed sample zone can be determined in each second sub-area, and both the length and the width of the fixed sample zone are S, and both the length and the width of the second sub-area are L, and both S and L are positive integers and 0<S<L, and the fixed sample zone can be located anywhere in the second sub-area. An embodiment of the disclosure will be described by way of an example in which the fixed sample zone is centered in the second sub-area. As illustrated in FIG. 3, there is a schematic diagram of fixed sample zones centered in respective second sub-areas.

A set area can be determined in each first sub-area, and for a first sub-area, the location, of the center of the set area in the first sub-area, in the first sub-area is the same as the location, of the center of the fixed sample zone in the corresponding second sub-area, in the second sub-area, and the aspect ratio of the set area is the same as the aspect ratio of the fixed sample zone, and the set area is no smaller than the fixed sample zone.

Figure 4A:
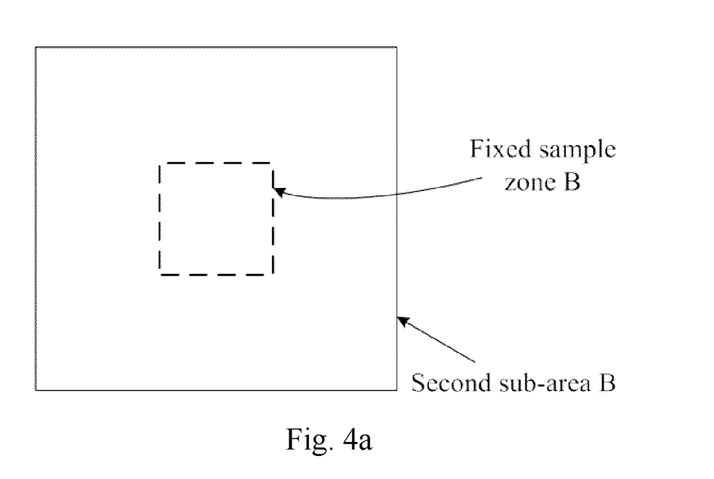
FIG. 4a is a schematic diagram of a fixed sample zone B in a second sub-area B according to an embodiment of the disclosure.

Taking the first sub-area A illustrated in FIG. 2a as an example, a second sub-area corresponding to the first sub-area is the second sub-area B illustrated in FIG. 2b, and if the center of a fixed sample zone B in the second sub-area B is the center of the second sub-area B (as illustrated in FIG. 4a), then the center of a set area in the first sub-area A is the center of the first sub-area A. If both the length and the width of the set area are S+2R, then a number $(2R+1)^2$ of floating sample zones can be determined in the set area, and R is an integer and $0 \leq R \leq (L-S)/2$.

Figure 4B:
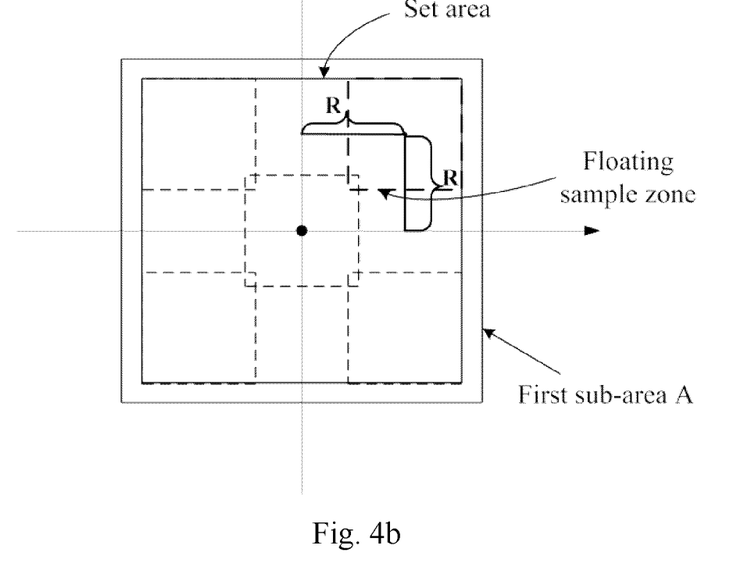
FIG. 4b is a schematic diagram of floating sample zones in a set area in a first sub-area A according to an embodiment of the disclosure.

As illustrated in FIG. 4b, there is a schematic diagram of floating sample zones in a set area in the first sub-area A. The size of the floating sample zone is the same as the size of the fixed sample zone, that is, both the length and the width of the floating sample zone are S. FIG. 4b illustrates only a part of floating sample zones, and the relative locations of the center of different floating sample zones to the center of the set area are different. If a coordinate system is created with its origin being the center of the set area, then for a floating sample zone, an offset of the center of the floating sample zone relative to the center of the set area (i.e., a sample zone offset of the floating sample zone) is represented as coordinate values (dw,dh) of the center of the floating sample zone in the coordinate system. dw below 0 indicates that the center of the floating sample zone is on the left of the center of the set area, and dh below 0 indicates that the center of the floating sample zone is below the center of the set area, and dw ranges from −R to R, and dh ranges from −R to R.

Since the location, of the center of the set area in the first sub-area A, in the first sub-area A is the same as the location, of the center of the fixed sample zone in the second sub-area B, in the second sub-area B, and the size of the floating sample zone is the same as the fixed sample zone, thus the sample zone offset of the floating sample zone in the set area is an offset of the floating sample zone relative to the fixed sample zone.

Taking the multiple floating sample zones in the set area illustrated in FIG. 4b as an example, for each floating sample zone, the feature difference between the floating sample zone and the fixed sample zone B in the second sub-area B can be determined. In an embodiment, for a floating sample zone, the feature difference between the floating sample zone and the fixed sample zone can be determined as follows.

For each first pixel in the floating sample zone, a significantly varying feature value of the first pixel is determined; and a significantly varying feature value of a second pixel in the fixed sample zone corresponding to the first pixel is determined. The location of the first pixel in the floating sample zone is the same as the location of the corresponding second pixel in the fixed sample zone.

The sum of absolute values of the differences between the determined significantly varying feature values of the respective first pixels and significantly varying feature values of the corresponding second pixels is determined as the feature difference between the floating sample zone and the fixed sample zone.

For the sake of a convenient description, a pixel in a floating sample zone will be referred to as a first pixel, and a pixel in a fixed sample zone will be referred to as a second pixel.

Figure 4C:
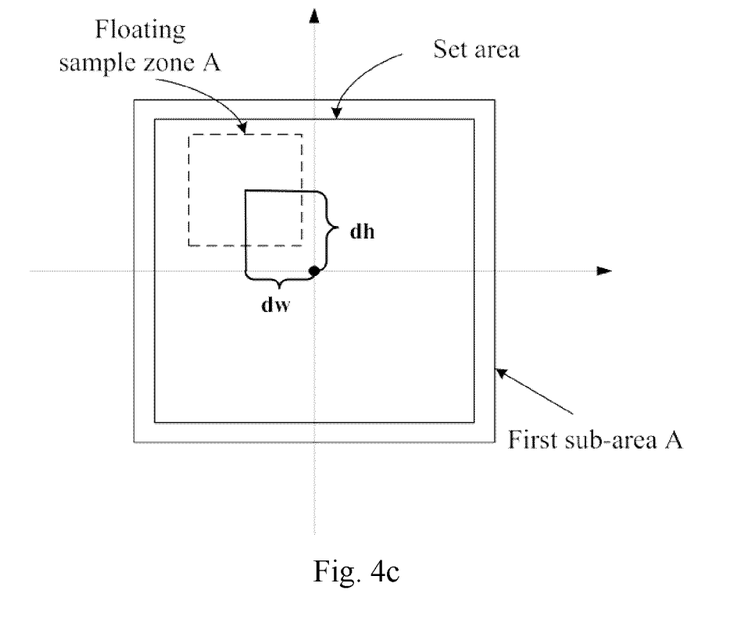
FIG. 4c is a schematic diagram of a floating sample zone A at a sample zone offset (dw,dh) in a set area in a first sub-area A according to an embodiment of the disclosure.

As illustrated in FIG. 4c, there is a schematic diagram of a floating sample zone A at a sample zone offset (dw,dh) in the set area in the first sub-area A. If a significantly varying feature value of a first pixel at the i-th row and the j-th column in the floating sample zone A is $MC_{float(dw,dh)}(i,j)$, and a significantly varying feature value of a second pixel at the i-th row and the j-th column in the fixed sample zone B is $MC_{fix}(i,j)$, then the feature difference $Diff_{(dw,dh)}$ between the floating sample zone A and the fixed sample zone B can be represented as:

$$Diff_{(dw,dh)} = \sum_{i=1,j=1}^{i=S,j=S} |MC_{float(dw,dh)}(i,j) - MC_{fix}(i,j)| \quad [1]$$

Figure 5A:
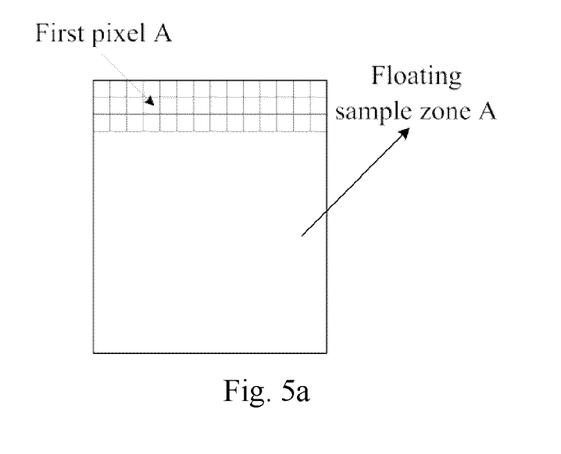
FIG. 5a is a schematic diagram of a first pixel A at the second row and the fourth column in the floating sample zone A according to an embodiment of the disclosure.
Figure 5B:
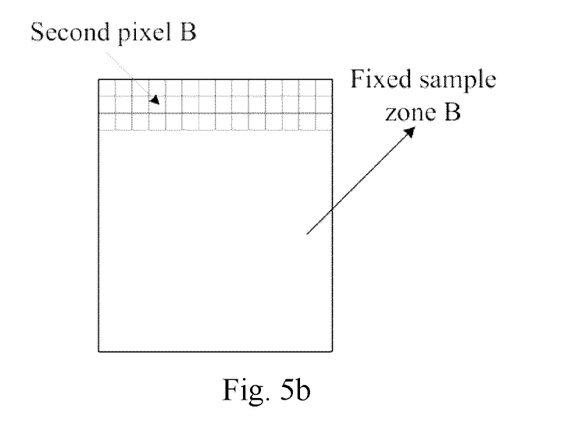
FIG. 5b is a schematic diagram of a second pixel B at the second row and the fourth column in a fixed sample zone B according to an embodiment of the disclosure.

As illustrated in FIG. 5a, there is a schematic diagram of a first pixel A at the second row and the fourth column in the floating sample zone A, and as illustrated in FIG. 5b, there is a schematic diagram of a second pixel B at the second row and the fourth column in the fixed sample zone B, and the second pixel B is a second pixel in the fixed sample zone B corresponding to the first pixel A in the floating sample zone A.

In some embodiments, for a floating sample zone, a significantly varying feature value of each first pixel in the floating sample zone can be determined as follows.

For each first pixel in the floating sample zone, pixels in the floating sample zone adjacent to the first pixel are determined; the nth power of the absolute value of the difference between a pixel value of each adjacent pixel and a pixel value of the first pixel is determined. n is a positive integer no less than 1; and the sum of the determined nth powers is determined as a varying feature value of the first pixel.

The average of the determined varying feature values of the respective first pixels is determined as a feature value of the floating sample zone.

For each first pixel in the floating sample zone, if the varying feature value of the first pixel is above the feature value of the floating sample zone, then the significantly varying feature value of the first pixel is the difference between the varying feature value of the first pixel and the feature value of the floating sample zone; and if the varying feature value of the first pixel is not above the feature value of the floating sample zone, then the significantly varying feature value of the first pixel is a set value.

For example, if a pixel value of a first pixel at the i-th row and the j-th column in the floating sample zone at the sample zone offset (dw,dh) in the set area illustrated in FIG. 4c is $F_{float(dw,dh)}(i,j)$, and pixel values of pixels adjacent to the first pixel include $F_{float(dw,dh)}(i+1,j)$, $F_{float(dw,dh)}(i-1,j)$, $F_{float(dw,dh)}(i,j+1)$ and $F_{float(dw,dh)}(i,j-1)$, then a varying feature value $C_{float(dw,dh)}(i,j)$ of the first pixel can be represented as:

$$C_{float(dw,dh)}(i,j) = |F_{float(dw,dh)}(i+1,j) - F_{float(dw,dh)}(i,j)|^n + \quad [2]$$
$$|F_{float(dw,dh)}(i-1,j) - F_{float(dw,dh)}(i,j)|^n +$$

-continued $$|F_{float(dw,dh)}(i, j+1) - F_{float(dw,dh)}(i, j)|^n +$$
$$|F_{float(dw,dh)}(i, j-1) - F_{float}(i, j)|^n$$

It shall be noted that if there is no pixel in a specific direction adjacent to the first pixel, then a pixel value of an adjacent pixel in that direction is 0. For example, if the first pixel is a first pixel at the top left corner in the floating sample zone, and there are no pixels on the left to and above the first pixel, then $F_{float(dw,dh)}(i-1,j)=0$ and $F_{float(dw,dh)}(i,j-1)=0$ In an implementation, pixels in two directions (e.g., on the right to and below the first pixel), other than all pixels, in the floating sample zone adjacent to the first pixel can be determined, and then the varying feature value $C'_{float(dw,dh)}(i,j)$ of the first pixel can be represented as:

$$C'_{float(dw,dh)}(i,j)=|F_{float(dw,dh)}(i+1,j)-F_{float(dw,dh)}(i,j)|^n+$$
$$|F_{float(dw,dh)}(i,j+1)-F_{float(dw,dh)}(i,j)|^n \quad [3]$$

After the varying feature value of each first pixel in the floating sample zone is determined, the feature value $\overline{C}_{float(dw,dh)}$ of the floating sample zone can be determined as:

$$\overline{C}_{float(dw,dh)} = \sum_{i=1,j=1}^{i=S,j=S} C_{float(dw,dh)}(i, j) \quad [4]$$

The significantly varying feature value $MC_{float(dw,dh)}(i,j)$ of the first pixel at the i-th row and the j-th column in the floating sample zone at the sample zone offset (dw,dh) can be represented as:

$$MC_{float(dw,dh)}(i, j) = \quad [5]$$
$$\begin{cases} C_{float(dw,dh)}(i, j) - \overline{C}_{float(dw,dh)}, & C_{float(dw,dh)}(i, j) > \overline{C}_{float(dw,dh)} \\ T, & C_{float(dw,dh)}(i, j) \leq \overline{C}_{float(dw,dh)} \end{cases};$$

The value of T can be 0.

Similarly a significantly varying feature value of each second pixel in the fixed sample zone can be determined as follows.

For each second pixel in the fixed sample zone, pixels in the fixed sample zone adjacent to the second pixel are determined; the nth power of the absolute value of the difference between a pixel value of each adjacent pixel and a pixel value of the second pixel is determined, n is a positive integer no less than 1; and the sum of the determined nth powers is determined as a varying feature value of the second pixel.

The average of the determined varying feature values of the respective second pixels is determined as a feature value of the fixed sample zone.

For each second pixel in the fixed sample zone, if the varying feature value of the second pixel is above the feature value of the fixed sample zone, then the significantly varying feature value of the second pixel is the difference between the varying feature value of the second pixel and the feature value of the fixed sample zone; and if the varying feature value of the second pixel is not above the feature value of the fixed sample zone, then the significantly varying feature value of the second pixel is a set value.

For example, if a pixel value of a second pixel at the i-th row and the j-th column in the fixed sample zone B in the second sub-area B illustrated in FIG. 4a is $F_{fix}(i,j)$, and pixel values of pixels adjacent to the second pixel include $F_{fix}(i+1, j)$, $F_{fix}(i-1,j)$, $F_{fix}(i,j+1)$ and $F_{fix}(i,j-1)$, then a varying feature value $C_{fix}(i,j)$ of the second pixel can be represented as:

$$C_{fix}(i,j)=F_{fix}(i+1,j)-F_{fix}(i,j)|n+|F_{fix}(i-1,j)-F_{fix}(i-1,j)-$$
$$F_{fix}(i,j)|^n+|F_{fix}(i,j+1)-F_{fix}(i,j)|^n+|F_{fix}(i,j-1)-Ff_{ix}$$
$$(i,j)|^n \quad [6]$$

It shall be noted that if there is no pixel in a specific direction adjacent to the second pixel, then a pixel value of an adjacent pixel in that direction is 0. For example, if the second pixel is a second pixel at the top left corner in the fixed sample zone, and there are no pixels on the left to and above the second pixel, then $F_{fix}(i-1,j)=0$ and $F_{fix}(i,j-1)=0$.

In some implementations, pixels in two directions (e.g., on the right to and below the second pixel), other than all pixels, in the fixed sample zone adjacent to the second pixel can be determined, and then the varying feature value $C'_{fix}(i,j)$ of the second pixel can be represented as:

$$C'_{fix}=|F_{fix}(i+1,j)-F_{fix}(i,j)|^n+|F_{fix}(i,j+1)-F_{fix}(i,j)|^n \quad [7]$$

After the varying feature value of each second pixel in the fixed sample zone is determined, the feature value $\overline{C}_{fix}$ of the fixed sample zone can be determined as:

$$\overline{C}_{fix} = \sum_{i=1,j=1}^{i=S,j=S} C_{fix}(i, j) \quad [8]$$

The significantly varying feature value $MC_{fix}(i,j)$ of the second pixel at the i-th row and the j-th column in the fixed sample zone B at the sample zone offset (dw,dh) can be represented as:

$$MC_{fix}(i, j) = \begin{cases} C_{fix}(i, j) - \overline{C}_{fix}, & C_{fix}(i, j) > \overline{C}_{fix} \\ T, & C_{fix}(i, j) \leq \overline{C}_{fix} \end{cases}; \quad [9]$$

It shall be noted that a pixel value of a pixel in a solution according to an embodiment of the disclosure can be an R (red) component or a G (green) component or a B (blue) component in an image in the RAW (unprocessed) format or can be a Y (brightness) component or a U (chrominance) component or a V (chrominance) component in an image in the YUV format or can be a R component or a G component or a B component in an image in the RGB format.

The foregoing description relates to how to determine, for a floating sample zone in a set area in a first sub-area, the feature difference between the floating sample zone and a fixed sample zone in the corresponding second sub-area, and for each of other floating sample zones in the set area, the feature difference between the other floating sample zone and the fixed sample zone can be determined in the method described above.

After the feature differences between all the floating sample zones in the set area and the fixed sample zone are determined, a floating sample zone with the lowest feature difference from the fixed sample zone can be selected from the floating sample zones, and the sample zone offset of the floating sample zone with the lowest feature difference from the fixed sample zone is determined as the area offset between the first sub-area and the corresponding second sub-area.

If there is the lowest feature difference between the floating sample zone A in the set area in the first sub-area A and the fixed sample zone B in the second sub-area B, then the area offset between the first sub-area A and the corresponding second sub-area B is the sample zone offset (dw, dh) of the floating sample zone A.

The foregoing description relates to how to determine for a first sub-area the area offset between the first sub-area and the corresponding second sub-area, and for each of other first sub-areas, the area offset between the other first sub-area and the corresponding second sub-area can be determined in the method described above.

In some implementations, a fixed sample zone can be set in the second sub-area of the image to be aligned and multiple floating sample zones can be set in the first sub-area of the target image. It shall be noted that in other implementations, multiple floating sample zones can be set in the second sub-area of the image to be aligned and a fixed sample zone can be set in the first sub-area of the target image to thereby determine the area offset between the second sub-area of the image to be aligned and the corresponding first sub-area.

If multiple floating sample zones are set in the first sub-area of the target image, significantly varying feature values of respective pixels in the multiple floating sample zones in the first sub-area of the target image can be calculated only once and area offsets of the other images to be aligned can be determined according to a result of the calculation. If multiple floating sample zones are set in the second sub-area of the image to be aligned and a fixed sample zone is set in the first sub-area of the target image, then for each image to be aligned, significantly varying feature values of respective pixels in the multiple floating sample zones in the second sub-area of the image to be aligned need to be calculated.

In the step 103, the image offset between the target image and the image to be aligned is determined as follows.

The same area offsets among the area offsets between all the first sub-areas and the corresponding second sub-areas are grouped; a first number of area offsets in the group including the largest number of area offsets is determined; and if the determined first number is not below M*N/2, then the area offsets included in the group corresponding to the first number are determined as the image offset between the target image and the image to be aligned.

If the determined first number is below M*N/2, then the area offsets corresponding to the second sub-areas are ranked in a descending order of the feature values of the fixed sample zones in the second sub-areas into a ranked set of area offsets; the same area offsets among the first K area offsets in the ranked set of area offsets are grouped, and the value of K can be the larger value of M and N, that is, if the value of M is larger than the value of N, then the value of K can be the value of M, or if the value of N is larger than the value of M, then the value of K can be the value of N; a second number of area offsets in the group including the largest number of area offsets is determined; and if the determined second number is not below K/2, then the area offsets included in the group corresponding to the second number are determined as the image offset between the target image and the image to be aligned. It shall be noted that if both the numbers of area offsets included in two groups are the second number, then the area offsets included in either of these two groups can be determined as the image offset between the target image and the image to be aligned.

If the determined second number is below K/2, then the average of the first K area offsets in the ranked set of area offsets are determined as the image offset between the target image and the image to be aligned.

Optionally if the determined first number is below M*N/2, then the area offsets corresponding to the second sub-areas can alliteratively be ranked in an ascending order of the feature values of the fixed sample zones in the second sub-areas into a ranked set of area offsets; the same area offsets among the last K area offsets in the ranked set of area offsets are grouped; a third number of area offsets in the group including the largest number of area offsets is determined; and if the determined third number is not below K/2, then the area offsets included in the group corresponding to the third number are determined as the image offset between the target image and the image to be aligned.

If the determined third number is below K/2, then the average of the last K area offsets in the ranked set of area offsets are determined as the image offset between the target image and the image to be aligned.

For example, if the determined area offsets between the 12 first sub-areas and the corresponding second sub-areas are (−1, −1), (0, 2), (−1, −1), (−3, 0), (−1, −1), (−3, −1), (−1, −1), (−3, −1), (−1, −1), (0, 2), (−1, −1) and (−1, −1) respectively, and the area offsets (−1, −1) are grouped as a group 1, the area offsets (0, 2) are grouped as a group 2, the area offsets (−3, 0) are grouped as a group 3, and the area offsets (−3, −1) are grouped as a group 4, then the number of area offsets included in the group 1 is 7, the number of area offsets included in the group 2 is 2, the number of area offsets included in the group 3 is 1, and the number of area offsets included in the group 4 is 2, and the number of area offsets included in the group 1 is the largest, so the first number can be determined as 7. Since the first number 7 is not below 6 (i.e., 4*3/2), then the image offset between the target image and the image to be aligned can be determined as (−1, −1).

In another example, if the determined area offsets between the 12 first sub-areas and the corresponding second sub-areas are (−1, −2), (0, 2), (−1, −2), (−3, 0), (0, 2), (−3, −1), (−1, −2), (−3, −1), (−1, −2), (0, 2), (−3, 0) and (−1, −2) respectively, and the area offsets (−1, −2) are grouped as a group 1, the area offsets (0, 2) are grouped as a group 2, the area offsets (−3, 0) are grouped as a group 3, and the area offsets (−3, −1) are grouped as a group 4, then the number of area offsets included in the group 1 is 5, the number of area offsets included in the group 2 is 3, the number of area offsets included in the group 3 is 2, and the number of area offsets included in the group 4 is 2, and the number of area offsets included in the group 1 is the largest, so the first number can be determined as 5. Since the first number 5 is below 6 (i.e., 4*3/2), then the area offsets corresponding to the second sub-areas are ranked in a descending order of the features values of the fixed sample zones in the second sub-areas into a ranked set of area offsets.

If the feature values $\overline{C}_{fix}$ of the fixed sample zones in the respective second sub-areas of the image to be aligned are 60, 30, 10, 40, 50, 20, 35, 45, 25, 15, 55 and 65 respectively, then a correspondence relationship between the feature values of the fixed sample zones in the second sub-areas and the area offsets corresponding to the second sub-areas is as depicted in Table 1 below:

TABLE 1

| Serial number of second sub-area | Feature value $\overline{C}_{fix}$ of fixed sample zone | Area offset (dw, dh) |
|---|---|---|
| 1 | 60 | (−1, −2) |
| 2 | 30 | (0, 2) |
| 3 | 10 | (−1, −2) |
| 4 | 40 | (−3, 0) |
| 5 | 50 | (0, 2) |
| 6 | 20 | (−3, −1) |
| 7 | 35 | (−1, −2) |
| 8 | 45 | (−3, −1) |
| 9 | 25 | (−1, −2) |

TABLE 1-continued

| Serial number of second sub-area | Feature value $\overline{C}_{fix}$ of fixed sample zone | Area offset (dw, dh) |
|---|---|---|
| 10 | 15 | (0, 2) |
| 11 | 55 | (−3, 0) |
| 12 | 65 | (−1, −2) |

Then the area offsets included in the ranked set of area offsets are (−1, −2), (−1, −2), (−3, 0), (0, 2), (−3,−1), (−3, 0), (−1, −2), (0, 2), (−1, −1), (−3, −1), (0, 2) and (−1, −2) respectively, the first four area offsets in the set of area offsets are (−1, −2), (−1, −2), (−3, 0) and (0, 2) respectively, and the area offsets (−1, −2) among the first four (i.e., K) area offsets are grouped as a group 11, the area offsets (−3, 0) among the first four area offsets are grouped as a group 12, and the area offsets (0, 2) among the first four area offsets are grouped as a group 13, and the number 2 of area offsets included in the group 11 is the largest, so the second number can be determined as 2, and since the second number is not below 2 (i.e., K/2), then the image offset between the target image and the image to be aligned can be determined as (−1, −2).

After the image offset between the target image and the image to be aligned is determined, the image to be aligned can be aligned, for example, if the determined image offset is (−1, −2), then the image to be aligned as a whole can be moved leftward by 1 pixel and downward by 2 pixels.

If there are multiple images to be aligned, then for each image to be aligned, the image to be aligned is aligned according to an image offset between the target image and the image to be aligned. After the multiple images to be aligned are aligned, image details with the predefined exposure can be selected respectively from the multiple aligned images and combined into a single image for a visual effect.

It shall be appreciated that embodiments as illustrated in FIG. 1 to FIG. 5 are only part of, rather than all of, embodiments of the present application. For clarity, steps in the above embodiments are performed in an order. However, an order in which the steps are performed does not limited to that as illustrated in FIG. 1 to FIG. 5, and the steps in the above embodiments can also be performed concurrently or in other way, all of which are encompassed in the scope of the present application. Moreover, steps in different embodiments can be combined to obtain other embodiments, which are also encompassed in the scope of the present application.

Another embodiment of the disclosure provides a device for determining an image offset. The device includes one or more processors and a storage medium in which computer readable program codes are stored, and the computer readable program codes stored in the storage medium are executed by the one or more processors to perform a method of determining an image offset, and the method of determining an image offset is similar to the method according to embodiments described above (i.e., embodiments as illustrated in FIG. 1 to FIG. 5 and other embodiments derived by those skilled in the art without departing from the scope of the disclosure), and a repeated description thereof will be omitted here. In an embodiment, as illustrated in FIG. 6, the device of determining an image offset generally includes an optical sensor 61, a memory 62 and a processor 63.

The optical sensor 61 is configured to acquire images, for example, acquire multiple images consecutively;

The memory 62 is configured to store the images acquired by the optical sensor 61; and The processor 63 is configured to read the images acquired by the optical sensor 61 from the memory 62, to determine a target image and an image to be aligned, to divide equally the target image into a number M*N of first sub-areas and divide equally the image to be aligned into a number M*N of second sub-areas, wherein the number of images acquired between the target image and the image to be aligned is below a preset threshold, and the aspect ratio of the target image is the same as the aspect ratio of the image to be aligned, and both M and N are positive integers, and the ratio of M to N is equal to the aspect ratios; and for each first sub-area in the target image, the processor 63 is configured to determine an area offset between the first sub-area and the corresponding second sub-area, wherein the location of the first sub-area in the target image is the same as the location of the corresponding second sub-area in the image to be aligned; and to determine an image offset between the target image and the image to be aligned according to the area offsets between the respective first sub-area and the corresponding second sub-areas.

Figure 6:
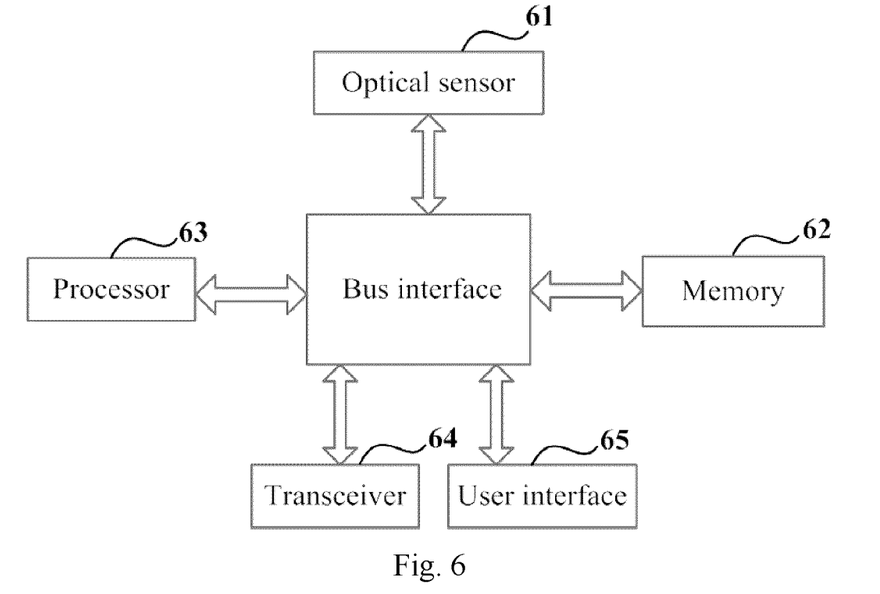
FIG. 6 is a schematic structural diagram of a device for determining an image offset according to an embodiment of the disclosure.

In FIG. 6, the bus architecture can include any number of interconnected buses and bridges linked together by various circuits of one or more processors represented by the processor 63 and one or more memories represented by the memory 62. The bus architecture can further link together various other circuits, e.g., prophetical devices, manostats, power management circuits, etc., all of which are well known in the art, so a further description thereof will be omitted in this context. The bus interface provides an interface. The transceiver 64 can be multiple elements including a transmitter and a receiver which are units for communication with various other devices over a transmission medium. For different user equipments, the user interface 65 can also be an interface capable of internal and external connection with desirable devices including but not limited to a keypad, a display, a speaker, a microphone, a joystick, etc.

The processor 63 is further configured:

to determine a fixed sample zone in the second sub-area; to determine a set area in the first sub-area, wherein the location of the center of the set area in the first sub-area is the same as the location of the center of the fixed sample zone in the second sub-area, and the aspect ratio of the set area is the same as the aspect ratio of the fixed sample zone, and the set area is no smaller than the fixed sample zone; to determine at least one floating sample zone in the set area, wherein the size of the floating sample zone is the same as the size of the fixed sample zone; for each floating sample zone in the set area, to determine the feature difference between the floating sample zone and the fixed sample zone and a sample zone offset of the floating sample zone, wherein the sample zone offset is coordinate values of the center of the floating sample zone in a coordinate system created with its origin being the center of the set area; to determine the floating sample zone, among all the floating sample zones in the set area, with the lowest feature difference from the fixed sample zone; and to determine the sample zone offset of the determined floating sample zone as the area offset between the first sub-area and the corresponding second sub-area.

The processor 63 is further configured:

for each first pixel in the floating sample zone, to determine a significantly varying feature value of the first pixel, and to determine a significantly varying feature value of a second pixel in the fixed sample zone corresponding to the first pixel, wherein the location of the first pixel in the floating sample zone is the same as the location of the corresponding second pixel in the fixed sample zone; and to determine the sum of absolute values of the differences between the determined significantly varying feature values of the respective first pixels and significantly varying feature values of the corresponding second pixels as the feature difference between the floating sample zone and the fixed sample zone.

The processor 63 configured to determine the significantly varying feature value of each first pixel in the floating sample zone is configured:

for each first pixel in the floating sample zone, to determine pixels in the floating sample zone adjacent to the first pixel; to determine the nth power of the absolute value of the difference between a pixel value of each adjacent pixel and a pixel value of the first pixel, wherein n is a positive integer no less than 1; to determine the sum of the determined nth powers as a varying feature value of the first pixel; to determine the average of the determined varying feature values of the respective first pixels as a feature value of the floating sample zone; and for each first pixel in the floating sample zone, if the varying feature value of the first pixel is above the feature value of the floating sample zone, to determine the difference between the varying feature value of the first pixel and the feature value of the floating sample zone as the significantly varying feature value of the first pixel, and if the varying feature value of the first pixel is not above the feature value of the floating sample zone, to determine a set value as the significantly varying feature value of the first pixel.

The processor 63 configured to determine the significantly varying feature value of each second pixel in the fixed sample zone is configured:

for each second pixel in the fixed sample zone, to determine pixels in the fixed sample zone adjacent to the second pixel; to determine the nth power of the absolute value of the difference between a pixel value of each adjacent pixel and a pixel value of the second pixel, wherein n is a positive integer; to determine the sum of the determined nth powers as a varying feature value of the second pixel; to determine the average of the determined varying feature values of the respective second pixels as a feature value of the fixed sample zone; and for each second pixel in the fixed sample zone, if the varying feature value of the second pixel is above the feature value of the fixed sample zone, to determine the difference between the varying feature value of the second pixel and the feature value of the fixed sample zone as the significantly varying feature value of the second pixel, and if the varying feature value of the second pixel is not above the feature value of the fixed sample zone, to determine a set value as the significantly varying feature value of the second pixel.

The processor 63 is further configured:

to group the same area offsets among the area offsets between all the first sub-areas and the corresponding second sub-areas; to determine a first number of area offsets in the group including the largest number of area offsets; and if the first number is not below M*N/2, to determine the area offsets included in the group corresponding to the first number as the image offset between the target image and the image to be aligned.

The processor 63 is further configured:

if the first number is below M*N/2, to rank the area offsets corresponding to the second sub-areas in a descending order of the feature values of the fixed sample zones in the second sub-areas into a ranked set of area offsets; to group the same area offsets among the first K area offsets in the ranked set of area offsets; to determine a second number of area offsets in the group including the largest number of area offsets; and if the second number is not below K/2, to determine the area offsets included in the group corresponding to the second number as the image offset between the target image and the image to be aligned.

The processor 63 is further configured, if the second number is below K/2, to determine the average of the first K area offsets as the image offset between the target image and the image to be aligned.

In another aspect, still another embodiment of the disclosure further provides a non-transitory computer readable storage medium which can be a computer readable storage medium included in the memory according to the embodiment described above or which can be embodied separately as a computer readable storage medium uninstalled in a terminal. The non-transitory computer readable storage medium stores one or more programs (in some embodiments, the non-transitory computer readable storage medium can be one or more magnetic disk storage devices, flash memory devices or other nonvolatile solid memory devices, CD-ROMs, optical memories, etc.), and the one or more programs are executed by one or more processors to perform a method of determining an image offset, and for steps included in the method, reference can be made to a relevant description of the embodiments illustrated in FIG. 1 to FIG. 5 and other embodiments derived by those skilled in the art without departing from the scope of the disclosure, so a repeated description thereof will be omitted here.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

From the disclosure provided herein, various modifications and variations can be made without departing from the essence and scope of the disclosure. Thus the disclosure is also intended to encompass these modifications and variations thereto.

What is claimed is:

1. A method of determining an image offset, comprising:

dividing equally an acquired target image into a number M*N of first sub-areas and dividing equally an acquired image to be aligned into a number M*N of second sub-areas, wherein a number of images acquired between the acquired target image and the acquired image to be aligned is below a preset threshold, and an aspect ratio of the target image is same as an aspect ratio of the image to be aligned, and both M and N are positive integers, and a ratio of M to N is equal to the aspect ratios;

for each first sub-area in the target image, determining an area offset between the first sub-area and a corresponding second sub-area in the image to be aligned, wherein a sub-area location of the first sub-area in the target image is same as a sub-area location of the corresponding second sub-area in the image to be aligned; and determining an image offset between the target image and the image to be aligned according to area offsets between respective first sub-areas and corresponding second sub-areas;

aligning the target image and the image to be aligned with the determined image offset.

2. The method of claim 1, wherein the determining the area offset between the first sub-area and the corresponding second sub-area comprises:

determining a fixed sample zone in the second sub-area;

determining a set area in the first sub-area, wherein a location of a center of the set area in the first sub-area is same as a location of a center of the fixed sample zone in the second sub-area, and an aspect ratio of the set area is same as an aspect ratio of the fixed sample zone, and the set area is no smaller than the fixed sample zone;

determining at least one floating sample zone in the set area, wherein a size of the floating sample zone is same as a size of the fixed sample zone;

for each floating sample zone in the set area, determining a feature difference between the floating sample zone and the fixed sample zone and a sample zone offset of the floating sample zone, wherein the sample zone offset is coordinate values of a center of the floating sample zone in a coordinate system created with its origin being the center of the set area;

determining a floating sample zone, among all floating sample zones in the set area, with the lowest feature difference from the fixed sample zone; and determining a sample zone offset of the determined floating sample zone as the area offset between the first sub-area and the corresponding second sub-area.

3. The method of claim 2, wherein the determining the feature difference between the floating sample zone and the fixed sample zone comprises:

for each first pixel in the floating sample zone, determining a significantly varying feature value of the first pixel, and determining a significantly varying feature value of a second pixel in the fixed sample zone corresponding to the first pixel, wherein a location of the first pixel in the floating sample zone is same as a location of the second pixel in the fixed sample zone; and determining a sum of absolute values of differences between determined significantly varying feature values of respective first pixels and significantly varying feature values of corresponding second pixels as the feature difference between the floating sample zone and the fixed sample zone.

4. The method of claim 3, wherein for each first pixel in the floating sample zone, the determining the significantly varying feature value of the first pixel comprises:

for each first pixel in the floating sample zone, determining pixels in the floating sample zone adjacent to the first pixel; determining an nth power of an absolute value of a difference between a pixel value of each adjacent pixel and a pixel value of the first pixel, wherein n is a positive integer no less than 1; and determining a sum of determined nth powers as a varying feature value of the first pixel;

determining an average of determined varying feature values of the respective first pixels as a feature value of the floating sample zone; and for each first pixel in the floating sample zone, if the varying feature value of the first pixel is above the feature value of the floating sample zone, then determining a difference between the varying feature value of the first pixel and the feature value of the floating sample zone as the significantly varying feature value of the first pixel; and if the varying feature value of the first pixel is not above the feature value of the floating sample zone, then determining a set value as the significantly varying feature value of the first pixel.

5. The method of claim 3, wherein for each second pixel in the fixed sample zone, the determining the significantly varying feature value of the second pixel comprises:

for each second pixel in the fixed sample zone, determining pixels in the fixed sample zone adjacent to the second pixel; determining an nth power of an absolute value of a difference between a pixel value of each adjacent pixel and a pixel value of the second pixel, wherein n is a positive integer; and determining a sum of determined nth powers as a varying feature value of the second pixel;

determining an average of determined varying feature values of the respective second pixels as a feature value of the fixed sample zone; and for each second pixel in the fixed sample zone, if the varying feature value of the second pixel is above the feature value of the fixed sample zone, then determining a difference between the varying feature value of the second pixel and the feature value of the fixed sample zone as the significantly varying feature value of the second pixel; and if the varying feature value of the second pixel is not above the feature value of the fixed sample zone, then determining a set value as the significantly varying feature value of the second pixel.

6. The method of claim 1, wherein the determining the image offset between the target image and the image to be aligned according to the area offsets between the respective first sub-areas and the corresponding second sub-areas comprises:

grouping same area offsets among the area offsets between the respective first sub-areas and the corresponding second sub-areas;

determining a first number of area offsets in a group comprising the largest number of area offsets; and if the first number is not below M*N/2, then determining the area offsets in the group corresponding to the first number as the image offset between the target image and the image to be aligned.

7. The method of claim 6, the determining the image offset between the target image and the image to be aligned according to the area offsets between the respective first sub-areas and the corresponding second sub-areas further comprises:
- if the first number is below M*N/2, then ranking the area offsets between the respective first sub-areas and the corresponding second sub-areas in a descending order of feature values of fixed sample zones in the second sub-areas to obtain a ranked set of area offsets;
- grouping same area offsets among first K area offsets in the ranked set of area offsets;
- determining a second number of area offsets in a group comprising the largest number of area offsets; and
- if the second number is not below K/2, then determining the area offsets in the group corresponding to the second number as the image offset between the target image and the image to be aligned.

8. The method of claim 7, the determining the image offset between the target image and the image to be aligned according to the area offsets between the respective first sub-areas and the corresponding second sub-areas further comprises:
- if the second number is below K/2, then determining an average of the first K area offsets as the image offset between the target image and the image to be aligned.

9. A device for determining an image offset, wherein the device comprises one or more processors and a storage medium in which computer readable program codes are stored, and the computer readable program codes stored in the storage medium are executed by the one or more processors to perform a method of determining an image offset, the method comprising:
- dividing equally an acquired target image into a number M*N of first sub-areas and dividing equally an acquired image to be aligned into a number M*N of second sub-areas, wherein a number of images acquired between the acquired target image and the acquired image to be aligned is below a preset threshold, and an aspect ratio of the target image is same as an aspect ratio of the image to be aligned, and both M and N are positive integers, and a ratio of M to N is equal to the aspect ratios;
- for each first sub-area in the target image, determining an area offset between the first sub-area and a corresponding second sub-area in the image to be aligned, wherein a sub-area location of the first sub-area in the target image is same as a sub-area location of the corresponding second sub-area in the image to be aligned; and
- determining an image offset between the target image and the image to be aligned according to area offsets between respective first sub-areas and corresponding second sub-areas;
- aligning the target image and the image to be aligned with the determined image offset.

10. The device of claim 9, wherein the determining the area offset between the first sub-area and the corresponding second sub-area comprises:
- determining a fixed sample zone in the second sub-area;
- determining a set area in the first sub-area, wherein a location of a center of the set area in the first sub-area is same as a location of a center of the fixed sample zone in the second sub-area, and an aspect ratio of the set area is same as an aspect ratio of the fixed sample zone, and the set area is no smaller than the fixed sample zone;
- determining at least one floating sample zone in the set area, wherein a size of the floating sample zone is same as a size of the fixed sample zone;
- for each floating sample zone in the set area, determining a feature difference between the floating sample zone and the fixed sample zone and a sample zone offset of the floating sample zone, wherein the sample zone offset is coordinate values of a center of the floating sample zone in a coordinate system created with its origin being the center of the set area;
- determining a floating sample zone, among all floating sample zones in the set area, with the lowest feature difference from the fixed sample zone; and
- determining a sample zone offset of the determined floating sample zone as the area offset between the first sub-area and the corresponding second sub-area.

11. The device of claim 10, wherein the determining the feature difference between the floating sample zone and the fixed sample zone comprises:
- for each first pixel in the floating sample zone, determining a significantly varying feature value of the first pixel, and determining a significantly varying feature value of a second pixel in the fixed sample zone corresponding to the first pixel, wherein a location of the first pixel in the floating sample zone is same as a location of the second pixel in the fixed sample zone; and
- determining a sum of absolute values of differences between determined significantly varying feature values of respective first pixels and significantly varying feature values of corresponding second pixels as the feature difference between the floating sample zone and the fixed sample zone.

12. The device of claim 11, wherein for each first pixel in the floating sample zone, the determining the significantly varying feature value of the first pixel comprises:
- for each first pixel in the floating sample zone, determining pixels in the floating sample zone adjacent to the first pixel; determining an nth power of an absolute value of a difference between a pixel value of each adjacent pixel and a pixel value of the first pixel, wherein n is a positive integer no less than 1; and determining a sum of determined nth powers as a varying feature value of the first pixel;
- determining an average of determined varying feature values of the respective first pixels as a feature value of the floating sample zone; and
- for each first pixel in the floating sample zone, if the varying feature value of the first pixel is above the feature value of the floating sample zone, then determining a difference between the varying feature value of the first pixel and the feature value of the floating sample zone as the significantly varying feature value of the first pixel; and if the varying feature value of the first pixel is not above the feature value of the floating sample zone, then determining a set value as the significantly varying feature value of the first pixel.

13. The device of claim 11, wherein for each second pixel in the fixed sample zone, the determining the significantly varying feature value of the second pixel comprises:
- for each second pixel in the fixed sample zone, determining pixels in the fixed sample zone adjacent to the second pixel; determining an nth power of an absolute value of a difference between a pixel value of each adjacent pixel and a pixel value of the second pixel, wherein n is a positive integer; and determining a sum of determined nth powers as a varying feature value of the second pixel;
- determining an average of determined varying feature values of the respective second pixels as a feature value of the fixed sample zone; and
- for each second pixel in the fixed sample zone, if the varying feature value of the second pixel is above the feature value of the fixed sample zone, then determining a difference between the varying feature value of the second pixel and the feature value of the fixed sample zone as the significantly varying feature value of the second pixel; and if the varying feature value of the second pixel is not above the feature value of the fixed sample zone, then determining a set value as the significantly varying feature value of the second pixel.

14. The device of claim 9, wherein the determining the image offset between the target image and the image to be aligned according to the area offsets between the respective first sub-areas and the corresponding second sub-areas comprises:
grouping same area offsets among the area offsets between the respective first sub-areas and the corresponding second sub-areas;
determining a first number of area offsets in a group comprising the largest number of area offsets; and
if the first number is not below M*N/2, then determining the area offsets in the group corresponding to the first number as the image offset between the target image and the image to be aligned.

15. The device of claim 14, wherein the determining the image offset between the target image and the image to be aligned according to the area offsets between the respective first sub-areas and the corresponding second sub-areas further comprises:
if the first number is below M*N/2, then ranking the area offsets between the respective first sub-areas and the corresponding second sub-areas in a descending order of feature values of fixed sample zones in the second sub-areas to obtain a ranked set of area offsets;
grouping same area offsets among first K area offsets in the ranked set of area offsets;
determining a second number of area offsets in a group comprising the largest number of area offsets; and
if the second number is not below K/2, then determining the area offsets in the group corresponding to the second number as the image offset between the target image and the image to be aligned.

16. The device of claim 15, the determining the image offset between the target image and the image to be aligned according to the area offsets between the respective first sub-areas and the corresponding second sub-areas further comprises:
if the second number is below K/2, then determining an average of the first K area offsets as the image offset between the target image and the image to be aligned.

17. A non-transitory computer-readable storage medium, storing computer readable program codes, the computer readable program codes being executable by one or more processors to perform a method of determining an image offset, the method comprising:
dividing equally an acquired target image into a number M*N of first sub-areas and dividing equally an acquired image to be aligned into a number M*N of second sub-areas, wherein a number of images acquired between the acquired target image and the acquired image to be aligned is below a preset threshold, and an aspect ratio of the target image is same as an aspect ratio of the image to be aligned, and both M and N are positive integers, and a ratio of M to N is equal to the aspect ratios;
for each first sub-area in the target image, determining an area offset between the first sub-area and a corresponding second sub-area in the image to be aligned, wherein a sub-area location of the first sub-area in the target image is same as a sub-area location of the corresponding second sub-area in the image to be aligned; and
determining an image offset between the target image and the image to be aligned according to area offsets between respective first sub-areas and corresponding second sub-areas;
aligning the target image and the image to be aligned with the determined image offset.

18. The non-transitory computer-readable storage medium of claim 17, wherein the determining the area offset between the first sub-area and the corresponding second sub-area comprises:
determining a fixed sample zone in the second sub-area;
determining a set area in the first sub-area, wherein a location of a center of the set area in the first sub-area is same as a location of a center of the fixed sample zone in the second sub-area, and an aspect ratio of the set area is same as an aspect ratio of the fixed sample zone, and the set area is no smaller than the fixed sample zone;
determining at least one floating sample zone in the set area, wherein a size of the floating sample zone is same as a size of the fixed sample zone;
for each floating sample zone in the set area, determining a feature difference between the floating sample zone and the fixed sample zone and a sample zone offset of the floating sample zone, wherein the sample zone offset is coordinate values of a center of the floating sample zone in a coordinate system created with its origin being the center of the set area;
determining a floating sample zone, among all floating sample zones in the set area, with the lowest feature difference from the fixed sample zone; and
determining a sample zone offset of the determined floating sample zone as the area offset between the first sub-area and the corresponding second sub-area.

19. The non-transitory computer-readable storage medium of claim 18, wherein the determining the feature difference between the floating sample zone and the fixed sample zone comprises:
for each first pixel in the floating sample zone, determining a significantly varying feature value of the first pixel, and determining a significantly varying feature value of a second pixel in the fixed sample zone corresponding to the first pixel, wherein a location of the first pixel in the floating sample zone is same as a location of the second pixel in the fixed sample zone; and
determining a sum of absolute values of differences between determined significantly varying feature values of respective first pixels and significantly varying feature values of corresponding second pixels as the feature difference between the floating sample zone and the fixed sample zone.

20. The non-transitory computer-readable storage medium of claim 19, wherein for each first pixel in the floating sample zone, the determining the significantly varying feature value of the first pixel comprises:
for each first pixel in the floating sample zone, determining pixels in the floating sample zone adjacent to the first pixel; determining an nth power of an absolute value of a difference between a pixel value of each adjacent pixel and a pixel value of the first pixel, wherein n is a positive integer no less than 1; and determining a sum of determined nth powers as a varying feature value of the first pixel;
determining an average of determined varying feature values of the respective first pixels as a feature value of the floating sample zone; and
for each first pixel in the floating sample zone, if the varying feature value of the first pixel is above the feature value of the floating sample zone, then determining a difference between the varying feature value of the first pixel and the feature value of the floating sample zone as the significantly varying feature value of the first pixel; and if the varying feature value of the first pixel is not above the feature value of the floating sample zone, then determining a set value as the significantly varying feature value of the first pixel.

\* \* \* \* \*